United States Patent [19]

Thompson

[11] 4,329,226
[45] May 11, 1982

[54] OIL RECONDITIONING SYSTEM

[75] Inventor: Bruce L. Thompson, Highland, Mich.

[73] Assignee: Amber Oil Process, Inc., Highland, Mich.

[21] Appl. No.: 48,230

[22] Filed: Jun. 13, 1979

Related U.S. Application Data

[63] Continuation-in-part of Ser. No. 927,350, Jul. 24, 1978, abandoned.

[51] Int. Cl.³ .............................................. B01D 35/18
[52] U.S. Cl. .................................... 210/180; 210/184; 210/489; 210/505
[58] Field of Search ............... 210/168, 180, 181, 184, 210/185, 186, 253, 258, 489, 491, 505, DIG. 5, 88; 196/46.1

[56] References Cited

U.S. PATENT DOCUMENTS

| | | | |
|---|---|---|---|
| 2,330,211 | 9/1943 | Haney | 210/505 X |
| 2,347,384 | 4/1944 | Winslow et al. | 210/505 X |
| 2,388,636 | 11/1945 | Harvout | 210/489 X |
| 2,411,539 | 11/1946 | Gunn | 210/168 X |
| 2,429,321 | 10/1947 | Brecque | 210/186 |
| 2,483,672 | 10/1949 | Robinson | 210/88 |
| 2,839,196 | 6/1958 | Schwalck | 210/180 X |
| 3,145,170 | 8/1964 | Baldwin et al. | 210/505 X |
| 3,550,781 | 12/1970 | Barrow | 210/180 |
| 3,616,885 | 11/1971 | Priest | 210/180 X |
| 3,756,412 | 9/1973 | Barrow | 210/180 |
| 3,915,860 | 10/1979 | Priest | 210/180 |
| 4,006,084 | 2/1977 | Priest | 210/180 |

Primary Examiner—John Adee
Attorney, Agent, or Firm—Cook, Wetzel & Egan, Ltd.

[57] ABSTRACT

An industrial oil reconditioning system forces dirty oil through a three-stage filter which usually includes a first stage comprising a blend of relatively flexible fibers and rigid fibers, a second stage which is all flexible fiber material, and a third stage, preferably of animal fiber. As the oil is forced through the system, under pressure, the fibers of the first and second stages are compressed. The fibers of the first and second stages are cut to a length which causes a weaving or matting during compression to prevent channels from forming in the filter through which oil might pass without being cleaned. The heat of the oil may be precisely controlled at different points in the system to thin the oil, to break emulsions, and to vaporize contaminant fluids. The filtering materials and temperatures may be varied depending upon the type of oil and contaminants being processed. Most industrial oils can be satisfactorily cleaned with one pass through the system. A number of convenience features are built into the system.

13 Claims, 3 Drawing Figures

OIL RECONDITIONING SYSTEM

This is a continuation-in-part of application Ser. No. 927,350, filed July 24, 1978, now abandoned.

This invention relates to oil reconditioning devices and more particularly to systems for cleaning both solid and fluid contaminants from any of a great variety of oils—especially, but not exclusively, industrial oils.

Glen R. Priest is named as the inventor of oil filters shown in U.S. Pat. Nos. 3,915,860 and 4,006,084 which may be used on or in connection with internal combustion engines. Therefore, these filters operate in an environment which is different from the environment of other filters that are used to clean and recondition industrial oil.

One problem which is encountered in the Priest filter is sometimes called "channeling". A channel could be defined as a path of least resistance through a filter, through which oil can travel without being cleaned. The low resistance enables a faster flowing current of oil, which leads to a void or channel with no filtering effect.

More particularly, the Priest filter used a fibrous filter (cotton) through which the oil must pass, as it is pumped under the engine oil pressure. The flowing oil finds the path of least resistance through the cotton fibers, where the oil flow rate increases. Since the faster flowing oil has a greater force, it tends to push away the cotton fibers and thereby further reduce the resistance to the oil flowing through the forming channel. As the flow rate increases, one or more channels could eventually open through the fibrous filter. Then, the filter loses its effectiveness and must be replaced.

Another problem with the Priest filter is that it works well when used in connection with an internal combustion engine, but it is not too well-suited for continuously processing industrial oil. More particularly, when the Priest filter is used on an internal combustion engine, the oil reaches temperatures above 400° F. and there is mechanical friction between the piston and cylinder walls. This cracks the oil and tends to re-refine it, which is important to Priest because the heavy hydrocarbon engine oil becomes contaminated with the light hydrocarbon fuel, which means that light and heavy hydrocarbons become mixed. The cracking removes carbon from the unwanted light hydrocarbon, and the Priest filter removes that carbon. Since the Priest filter continuously works on the same oil, the unwanted light hydrocarbon contaminant is progressively removed from the wanted heavy hydrocarbon.

The industrial oils are not likely to become mixed with other hydrocarbons and do not require one hydrocarbon to be separated from another hydrocarbon. Hence, the cracking and re-refining are irrelevant to the processing of these oils. Instead, industrial oils tend to become contaminated with emulsified liquids (usually water) and solids. Therefore, an industrial oil reconditioning system is directed to breaking up the emulsion. Since emulsions do not occur in internal combustion engines, the Priest filtering system is not designed to break the emulsion. If an attempt is made to use the Priest filter for reconditioning an industrial oil, it does not perform adequately and successfully over a practically useful period of time.

Unlike the limited amount of oil in an internal combustion engine, industrial oil is not utilized as a small batch of oil and is not usually recirculated continuously through a filter. Therefore, an industrial oil-filtering system is not adapted to continuously reprocess the same batch of oil. Rather, an industrial oil filtering system must reprocess and clean the oil entirely on a single pass through the system.

A number of U.S. Pat. Nos. (2,330,211; 2,347,384; and 3,145,170) show various combinations of materials such as: ramie, jute, cotton, wood pulp, wood shavings or chips, rice hulls, and the like. Use of these materials presents a number of problems. Many of these materials, such as wood, add contaminants, such as turpentine, for example, which tends to be more serious than some of the contaminants which are being removed from the oil. Other of the materials, such as rice hulls, deteriorate and add particulates to the oil instead of removing them. Still other of the materials, such as jute, could have extremely long, coarse fibers which extend all or part of the way through the filter. The processed oil will then follow the fibers, almost as if they were pipes which guide and direct the flow of the oil. Still other material, such as too finely divided wood pulp could compact into such a dense filter that the oil cannot penetrate it, for all practical matters. Thus, the known blends have not been satisfactory.

Therefore, an object to the invention is to provide oil reconditioning systems for cleaning and processing the oil, preferably in a single pass through the filter. Here an object is to provide such systems for use with any of many different forms and types of oils, especially industrial oils, hydraulic fluids, and the like.

Another object of the invention is to provide new and improved fibrous filters which do not channel, especially—but not exclusively—for the use in a Priest type filter.

Still another object of the invention is to provide new and improved multi-stage oil filters which can be manufactured without the use of sophisticated ram-packing machinery.

Yet another object of the invention is to provide new and improved oil filters which insure that all of the oil is distributed uniformly throughout the filter.

A further object of the invention is to provide new and improved filter material, especially for reconditioning industrial oils, which filter material does not add chemicals or contaminants when used in its natural state.

Another object of the invention is to provide new and useful filter material which mechanically polishes molecules to remove dirt clinging thereto, in addition to removing contaminants.

In keeping with an aspect of the invention, these and other objects are accomplished by a system which forces oil through a three-stage filter that includes two stages of fibrous packing materials, and a third stage of animal fibers. The first stage of packing comprises a mixture of flexible and rigid fibers. The flexible fibers may be a cotton-polyester blend and the rigid fibers may be wood, for example. The second stage includes only the flexible fibers (cotton-polyester blend, for example). The third stage includes only animal fibers, such as wool felt. The oil compresses the fibers of the first and second stages until the compression forces within the packing materials become equal to and are overcome by the oil pressure. Then, the oil flows through the three filter stages, in series. Thereafter, the oil flows from the filters and through a zero humidity chamber which vaporizes any liquids capable of separating from the oil, (such as water), which have become mixed with the oil. Materials can be cleaned with one pass through the system. The system includes controls, conduits, and the like for enabling the oil to pass through the filters at the prescribed rates and temperatures.

The flexible fibers of the first and second stages may be threads made of a cotton-polyester blend which absorbs contaminants directly and also separates contaminants by mechanically polishing molecules of the substance being filtered. The rigid fibers of the first stage are preferably aspen wood, since it is a material which does not give off contaminants. Each filter stage may be made by mixing the appropriate fibers very loosely, as by blowing them simultaneously into a container and there allowing them to settle under gravity. As these air-laden fibers settle, they tend to lie horizontally in a random weave pattern. As they are compressed by the pressure of incoming oil, the fibers tend to be tensioned, and thereby weave themselves together into a mat. The quality of the mat is determined by the length of the fibers. If the fibers are too short, they become overly compact. The oil will only pass through the filter stage slowly, under great pressure. If the fibers are too long, they do not tend to become tensioned correctly and, therefore, leave loose strands which the oil follows and forms a channel through the fibers. Thereafter, the oil passes through the filter stage without being cleaned.

The invention uses no chemicals or liquids or any other foreign material except for a cotton-polyester blend thread, aspen wood fibers, and a felt disc. With this unique design, industrial oils may be returned to a useful condition with all of the original additives still intact. Solid and water contaminants are removed, including emulsified, finely divided and suspended water. Thus, industrial oil can be restored to an operational condition from any suitable storage container, tank, barrels, pits, etc. It is not necessary to have the industrial oil circulating through the machine.

Another unique feature of the inventive device is that all of the contaminants are removed from the industrial oil in one pass through the equipment. It is not necessary to pass the industrial oil through the equipment time and time again, as is usually necessary in prior devices.

A preferred embodiment of such an oil reconditioning system is shown in the attached drawings, in which.

Figure 1:
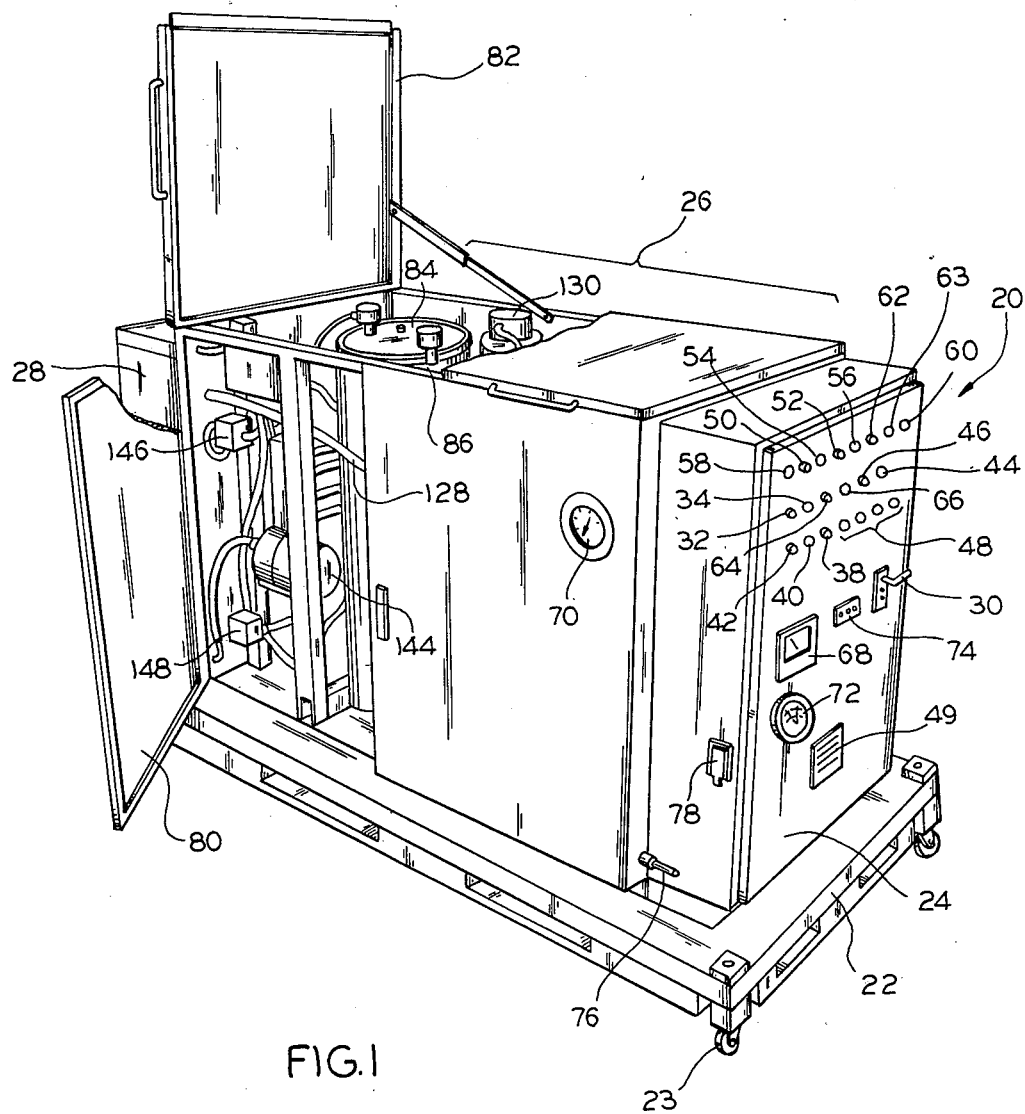
FIG. 1 is a perspective view of the inventive oil reconditioning system, with two access doors open.

The principal parts of the inventive machine (FIG. 1), include a free standing cabinet 20 mounted on a fork-lift truck pallet 22, which may be supported by casters, such as 23. The cabinet 20 includes a control panel 24, a filtration cabinet 26, and reservoir 28 for receiving and temporarily storing the clean oil.

The control panel 24 includes a combination of levers and push buttons for commanding system performance and of associated lights for indicating the system operation and performance. In greater detail, a lever 30 is provided to switch power off and on. Once power is switched on, a filtering cycle begins when a start push button 32 is pushed, and an associated lamp 34 lights to indicate that the filtering system is in operation. A push button 38 may be pushed to delay or stop the filtering any time during a filtering cycle, which is indicated by a lit lamp 40. To restart during the cycle while lamp 40 is lit, a restart push button 42 may be pushed.

If any problems should occur, the filtering machine may be stopped by an emergency stop button 44, and a lamp 46 lights. One or more lamps 48 light to identify any emergency problems, such as: high pressure, low pressure, or high temperature and a suitable audible signal is given by horn 49, to indicate the existence of an emergency condition.

During filtration, the invention contemplates a use of a number of different heating elements which may be individually selected by pushing one or the other (or both) of the push buttons 50, 52, thereby giving low, intermediate and high temperatures. Of course, any suitable continuous or graduated heat selection may also be provided. Lamps 54, 56 light to indicate the level of the heat which is selected by the operation of the push buttons 50, 52. A pair of lamps 58, 60 light to indicate that the cabinet is adequately grounded. These two lamps 58, 60 are provided to increase reliability through redundancy.

As the reservoir 28, is filled, a push button 62 may be pushed to pump the reconditioned oil from the filtering system into any suitable container (not shown), which ends the processing of the oil in the inventive system. Lamp 63 indicates that the reservoir is emptying.

If it should become necessary to replace the filters or to clear out the system, push button 64 is pushed and the system is reverse pumped. A lamp 66 lights to indicate that the system is being pumped out.

To facilitate a proper operation of the system, the user is given visible readings of temperature at gauge 68 and oil pressure at 70. Meter 72 records the total volume of oil that is processed on an odometer type of display device. The total elapsed time during which the system operates is displayed at 74. These volume and time readings may be used for billing, production control, or the like.

Compressed air from any suitable source may be introduced into the system at a fitting 76 in order to provide the pressure to assist in removal of the fibrous filter material. An electrical convenience outlet 78 enables any suitable equipment to be powered.

Figure 2:
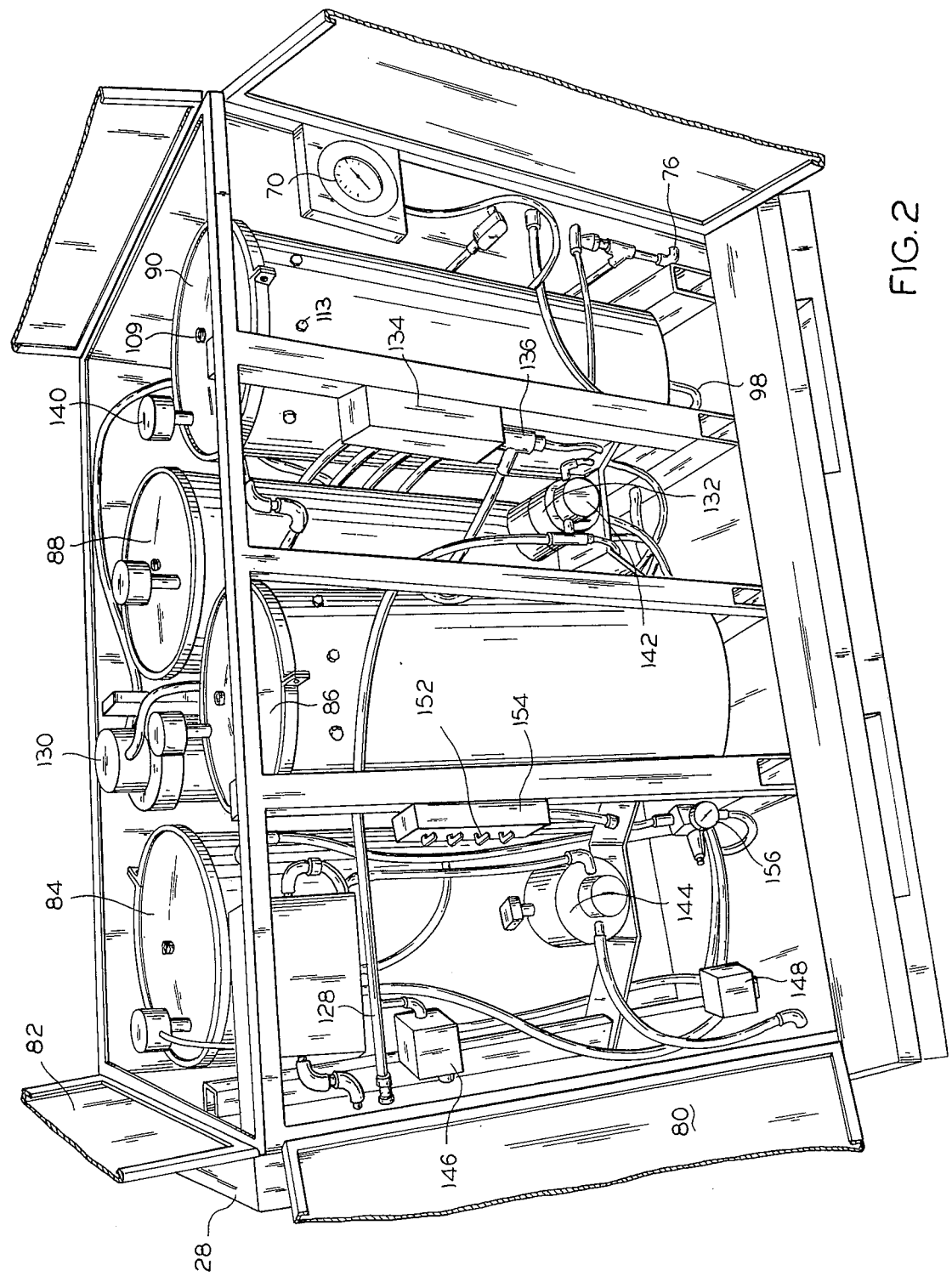
FIG. 2 is a perspective view of the same system with all access doors and panels removed.

Normally all of the system is enclosed within a locked housing comprising removable access doors and panels, two 80, 82 of which are shown opened in FIG. 1. If each of these doors and panels is removed, the filtration system is exposed (FIG. 2). Preferably, all electrical components in the entire system are made explosion proof.

Four filters 84, 86, 88, 90 are provided to be used either sequentially or in parallel to increase the time period between filter replacement or the flow of processed oil per unit time. That is, filter material may be replaced in all four filters 84, 86, 88, 90 and then each may be used in succession, with one filter taking over as another filter becomes fully contaminanted. Thus, the period between maintenance calls may be up to four times longer than it would be, if the filter material must be replaced immediately after it has become contaminanted, in any given filter. If all four filters are operated simultaneously, four times as much oil is processed, per unit time, as would be processed by a single filter acting alone. Of course, various mixes may also be used where, say two, or three filters are used simultaneously. Or one filter may be used at one time and a multiple number of filters may be used at another time.

Each of the four filters 84, 86, 88, 90 has an identical structure (FIG. 3) which is similar to the Priest filter shown and described in U.S. Pat. No. 4,006,084. However, the inventive and Priest filters are different in that Priest has only one heating element 91, which does not give a selective multiplicity of heating ranges. The invention introduces a second heating element, at 92 in order to give three separate heat settings and, therefore, a more precise control over the heat. The electrical connections are made to these elements via an explosion proof box 140, as symbolically shown at 141. Any suitable number of elements, or a continuously variable element may be used. These heating elements may be plug-in units to facilitate an easy replacement thereof. The oil being reconditioned never comes into contact with the coils; therefore, the heat of the coil has no effect upon additives which may be intentionally combined with the oil. There are also differences in the filter material 93 used in the filter and in the response of the filter to a cleaning of the oil.

Figure 3:
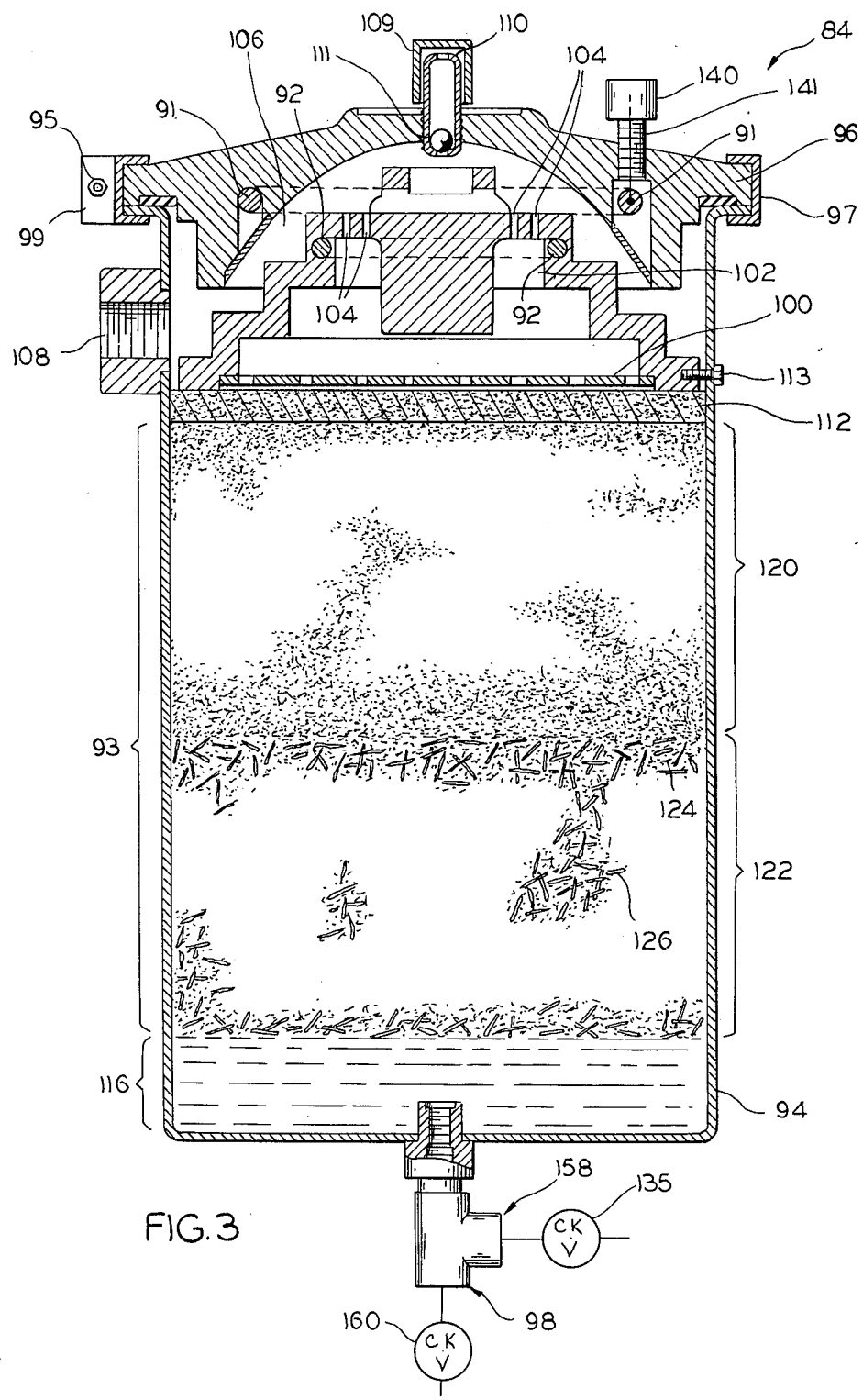
FIG. 3 is a cross-sectional view of a modification of the Priest filter, using the inventive filtering material.

Since most of the structure shown in FIG. 3 is already described in the Priest patent, the following description will be brief.

The filter housing comprises a lower cup shaped member 94 closed at the top by a lid or top 96. The lid is secured to the cup-shaped member by a hoop 97 having a generally C-shaped cross section for embracing outstanding peripheral lips on the cup and top. The hoop is secured in place by passing a bolt through outstanding ears 99 on the hoop and attaching a nut 95 onto the bolt. In one particular embodiment actually built and tested, member 94 is 18-inches in diameter and 42-inches high. Oil enters an orifice 98 at the bottom of the cup shaped housing 94, flows upwardly through fibrous filter materials 93 and 112, a perforated plate 100, exchange cavity 102, perforations 104, a vaporization chamber 106, and out an outlet 108. The perforated plate is attached to the bottom of a stepped metal member which is attached to the cup-shaped housing by a plurality of radially-extending bolts, one of which is seen at 113.

Vapors and gases vent out of an opening 110 at the top of the chamber 106. A ball check valve 111 in the opening enables hot gas to escape but floats to the top to prevent oil from escaping. A dust cover 109 closes the top of the opening 110 to keep out foreign objects while allowing hot gas to escape.

The cup-shaped housing 94 is filled with three separate filter stages. When oil first enters orifice 98, the fibrous filter 93 is dry and resists wetting, so that no oil passes through it. Accordingly, the inflowing oil is initially confined in the housing space 116 below the filter material 93. As the oil continues to flow into space 116, the dual filter material 93 is compressed as it is squeezed upwardly, to reduce the interstices between the individual fibers of the filter material. As will become more apparent, the squeezing together of the filter fibers tends to compress and tension them to produce a randomly woven mat.

Eventually, the filter material 93 compresses into a fairly dense mat with the fibers overlying the weaving between each other with the fibers in tension. The resistance to oil flow is approximately the same force as the force which is being exerted by the pressure of the oil which continues to be pumped through inlet 98 and into the housing chamber portion 116. After this pressure equilibrium point is passed, the chamber 116 pressure forces the oil to enter and pass through the dual fibrous filter 93. The various parameters of pressure, fiber length, mat density, etc. are correctly interrelated when the lower surface of filter material 122 remains parallel to the bottom of the housing (i.e., the two sides of area 116 are parallel when the filter is compressed).

In one embodiment, oil passes through the filter material 93 when the pressure chamber 116 is at 60 PSI; however, higher pressures may produce superior results, but finer mesh filters might then be desired. Any suitable pressure could be used if the diameter of the chamber is suitably changed. This chamber 116 pressure wets the filter fibers and enables the oil to flow smoothly into and out of the filter. Then, if desired, the incoming oil flow may be reduced sharply without casing the filter material 93 to lose its compression. A reduced flow may be desired if the oil should remain in the filter 84 for longer periods of time.

After the oil is forced through the filter material 93, it enters the felt pad 112. The felt pad 112 absorbs small particulate matter and water from the oil, and also prevents fibers from being carried away from the fibrous filter material 93 by the oil.

After the oil is forced through the felt pad 112, it enters chamber 106 which is heated to a temperature which is high enough to cause a zero humidity within the chamber and vaporize the water, if any. The temperature established in chamber 106 depends on the type and amount of contaminant and the type of oil being processed. Usually the contaminant is water, in which case zero humidity is achieved when the temperature of chamber 106 is about 180 to 250 degrees fahrenheit. When water is present in a zero humidity environment, it becomes a vapor and does not condense into water.

The actual temperature of the oil in the filtration system must not be high enough to result in a loss of desired additives intentionally mixed into the oil, which additives might tend to be damaged or destroyed at higher temperatures. On the other hand, the temperature should be high enough to thin the oil and get a better oil flow.

In order to control the heat in the vapor chamber 106, the inventive filter 84 has a plurality of heating elements. More specifically, in this particular embodiment there are two heating coils 91 and 92 which may be selectively energized to give any one of of three different heat levels (i.e. either or both coils may be energized either individually or together to give three heat ranges which are all flexible).

Preferably, the three-stage filter material 93 comprises stage 122 which is a mixture of flexible and rigid fibers, stage 120 which is exclusively flexible fibers, and stage 112 which is wool felt. The flexible fibers 124 are preferably a blend of cotton and polyester origin and the rigid fibers 126 are of wooden origin. The exact nature and proportions of the material used may vary with the type of oil that is being processed.

For the first stage 122, the flexible and rigid fibers are first separated into their individual fibrous states, from which they may be mixed by being blown together in a common mixing chamber. The ratio of the flexible to rigid fibers may be selected according to the specific needs that are being met by the filter. In one embodiment for reconditioning and cleaning hydraulic fluid, which was actually built and tested, with excellent results, the ratio was 60% cotton and 40% wood fibers. Usually, it is thought that the wood fibers will not exceed about 50% of the total volume of material 122.

In an embodiment which was made and successfully tested with industrial oil, the first stage included approximately twenty-eight pounds of a carefully blended material of approximately 60% white cotton-polyester blend thread material cut in strands, each approximately 3 inches in length. The other 40% of the blend is aspen wood fibers, each approximately 3 inches in length and 9/1000 inches in diameter. The rigid fibers may be visualized by thinking of three-inch-long pieces of the excelsior similar to that which is widely used as a shock-absorbing material for packing fragile items. Aspen wood is preferred because it has inherent qualities which allow it to be compressed and to pass hot oil without leaching contaminants such as turpentine, and the like, into the oil. The main function of the aspen wood fibers is to create a tumbling action of the oil molecules, which is necessary to break the emulsified, finely-divided and suspended water from the oil.

The more or less uniform length of three inches for all fibers is selected to cause a better weaving. That is, as the flexible and rigid fibers are blown from separate sources into a heap of randomly fallen fibers, they tend to overlap and thread through each other. Under gravity, they all lie horizontally in a loosely and randomly woven pattern. Since all threads and fibers are approximately the same length, the probability of random distribution leads to a weave which is uniform throughout. The three-inch length was selected for the described embodiment on a basis of the internal diameter of the filter housing. In the same embodiment, the second stage has twenty-eight pounds of 100% white cotton-polyester blend thread cut into strands approximately 3 inches in length. The 100% white cotton-polyester blend thread is cut into this size because it enables a complete seal to form against the vessel walls, when compressed under pressure. If this complete seal is not made, channeling may occur which would render the oil unsuitable.

Once a tumbling action of the oil is created in the first stage, the second stage polishes the oil molecules and absorbs the water which has been released from the oil during the tumbling action.

The third stage was a pad consisting of fibrous wool felt, which meets the specifications promulgated in Class 17R2 of the Wool Felt Specifications and Data of the Northern Textile Association (NTA). The NTA Class 17R2 corresponds to SAE No. F26 and ASTM-CF 206 classification 8R5. It is composed of a minimum fiber basis of 45% wool content, a maximum of other fibers of 55%, and a minimum chemical basis of 40% wool content. It displays the following chemical properties: a maximum chlorothene solubility of 8.0% and a maximum water solubility of 6.0%, for a total chlorothene/water solubility of 14.0%. It also has a maximum ash content os 5.0%. The density of the wool felt is 10.6 lb./cu. ft. The pad is normally grey. In the preferred embodiment, the thickness of the pad is one-half inch thick, although that is not necessarily too critical, and a range of 0.125 to 1 inch thickness is contemplated.

In general, the principles are that the molecules of the fast flowing oil strike the rigid aspen fibers from which they ricochet and are deflected in random directions. The impact between the molecule and the rigid fiber causes the oil to tumble and has an effect which might be thought of as polishing the molecules of oil to mechanically rub off the physical contaminants. Also, with the ricocheting, there is no steady stream of oil flowing through a single path of least resistance to push fibers aside and create a channel through the packing material. Rather, the ricocheting molecules bombard each flexible fiber from almost all directions, whereby it tends to remain more or less tensioned and fixed in its original position within filter material 122.

After the oil has traveled a discrete distance through packing material 122, the flow smooths out so that substantially the same amount of oil flowing through any one given area of the filter also flows through all other given areas of the same size. For example, a fast flowing stream of oil directly in front of orifice 98 tends to have more force than a sluggish stream in some other area, such as, say, a quarter inch in form a side of the container 94. If so, there could be a tendency for channeling to occur directly in front of the orifice 98.

The rigid fibers 126 prevent this channeling, but it cannot affect the pressure of the oil stream directly in front of the orifice 98. Therefore, different amounts of oil enter the filter material 122 at different speeds across the surface where the oil in chamber 116 meets filter material 122. However, the higher velocity of the oil in the area directly in front of orifice 98 causes a greater dispersion of the molecules, which ricochet at higher velocity than occurs in the areas where the oil flow is more sluggish. Also, the ricocheting, fast flowing molecules drive adjacent slower flowing molecules sidewise to divert them and better distribute the force of the flowing oil. A result is that the oil flow reaches substantial uniformity across the entire cross-section of the filter material 122.

The length of the fibers of the first and second stages in also important to prevent channeling. The fibers must be long enough to mat down and randomly weave under pressure, but not so long that oil can flow continuously through the filter stage along a single fiber, thereby creating a channel. It is expected that the length of the fibers will be approximately 1/6 of the diameter of the filter housing, but in no event will the fibers be so short that they do not weave when they are compressed, or longer than the minimum height of the filter stage 122 when it is at its maximum compression. The rigid fibers should be approximately the same length as the flexible fibers, to create a consistent weave. As noted above, a characteristic of a filter with fibers having a correct length is that the bottom of the compressed filter (i.e., the interface between areas 93 and 116 in FIG. 3) is parallel with the bottom of the housing 94. The most uniform parallelism indicates the best characteristic of the filter material. The effectiveness of the filter is improved if the fibers are kept dry both when the filter is originally formed and thereafter while the filter is stored and before it is put into use.

Excessive moisture in the fibers may lower the equilibrium pressure at which oil begins to pass through the system. This would result in less compression of the fibers, which reduces the effectiveness of the filter. Therefore, beginning just before manufacture and continuing through the insertion of the filter into the housing 94, the filter must be kept dry, at all times.

It is thought that the remaining components in the inventive system (FIG. 2) will be understood best from a description of how the system operates. The oil to be reprocessed reaches a holding tank (not shown) at any convenient location. From there, it is conveyed through any suitable hose, pipe, or the like 128 (FIG. 2) into a heater 130 which includes a tank that is large enough to insure that the oil will reach a predetermined temperature before it is delivered to the filters. Thus, the oil flows continuously into heater 130 at an ambient room temperature and continuously out of the heater at a predetermined higher temperature (such at 110-degrees fahrenheit, for example). A pump 132 draws the oil through the heater 130 to a manifold 134. A thermocouple 136 monitors and controls the heat of the incoming oil.

Valves (not shown) are selectively operated in manifold 134 in order to select one or more of the filters 84, 86, 88, 90. Depending upon such valve settings, oil flows from heater 30, through manifold 134, and via orifice 98 (FIG. 3), into filter 90, for example. A check valve 135 (FIG. 3), prevents the oil from flowing out a compressed air intake line.

Switches on control panel 24 (FIG. 1) are operated to heat the vaporization chamber 106 (FIG. 3) to a specific temperature via electrical connections made through the junction box 140 (FIG. 2). A suitable flow meter 142 sends electrical pulses to a flow meter 72 (FIG. 1) for recording the total amount of oil that is processed.

The oil flows through the filter 90 (for example) during a period which might be in the order of a half of a minute, in some systems. The reconditioned and clean oil leaves the active filter by gravity flow into the reservoir 28, which is a buffer storage unit. Pump 144 draws the oil from the reservoir and delivers it to a final storage unit. A pair of float-controlled switches 146, 148 measure and detect upper and lower levels of oil stored in reservoir 28. When the reprocessed oil rises to operate the lower level switch 148, oil is pumped from the reservoir 28 to any location, as may be desired. If the system backs up, the upper float-controlled switch 146 operates to stop the reprocessing system. Pump 144 may be either manually or automatically controlled.

Eventually, the filter material 93 (FIG. 3) becomes contaminated. In one embodiment actually built and tested, this contamination occurred after 2000 to 4000 gallons of oil had been processed. The first step in filter material replacement is to operate push button 64 (FIG. 1) to reverse pump all oil from the system. To prevent the filter material 124, 126 from entering the inlet 98 during reverse pumping, a suitable screen (not shown) is positioned over the filter end of filter 98.

Assuming that the filter material 93, 112 (FIG. 3) is to be replaced in filter 90 (FIG. 2), the nut 95 (FIG. 3), and then hoop 97, are removed. The lid or top 96 is lifted off the housing 94. The radial bolts 113 are removed, together with all of the internal filter parts down to the plate 100. Next, a valve (such as 152 FIG. 2) is operated on a compressed airmanifold 154. Compressed air, introduced into the system at 76, is fed through a pressure controller 156 and the operated manifold valve 152, to an input 158 (FIG. 3) at the bottom of the cup-shaped filter housing 94. A check valve 160 prevents the compressed air from feeding back through inlet 98 and into the oil delivery system.

Compressed air entering the filter housing chamber 116 blows the dual filter material 93 and felt pad 112 either entirely out of the cup-shaped housing 94 or into a position from which it may easily be lifted out.

Then, a fresh supply of dry filter material 93 and a new felt pad 112 may be placed into the bottom of the housing 94. If desired, the material 93 may be precompressed to approximately the volume which it has after the oil has entered into chamber 116 in sufficient quantity to wet and flow through the filter material 93. An advantage of such precompression is that material 93 is easier to handle and that the time required for oil to wet the filter material may be reduced sharply.

In any event, whether precompressed or not, the filter material 93 is placed in the bottom of the cup shaped housing 94. The parts of the filter above felt pad 112, which were previously removed, are returned to their installed positions as shown in FIG. 3. Then, the bolts 113, hoop 97, the bolt and nut 95 are replaced and tightened. The system may now be returned to operation.

The advantages of the invention should now be clear. The ability to recondition "dirty" oil results in a substantial savings of a critical natural resource which is in short and diminishing supply. In one case, the novel inventive filter material was found to have approximately 800% of the service life of the original Priest filter material. Also, the invention has made it possible to continuously process industrial oils (as distinguished from the repeated batch processing of a limited amount of engine oil). The separate and controllable heaters 91, 92 (FIG. 3) and 130 (FIG. 2) of the inventive system may be coordinated and individually controlled to process any of many different types of oils, as distinguished from the single oil-type filtering performed by the Priest filter.

Those who are skilled in the art will readily perceive how changes may be made in the disclosed structure and method. Therefore, the appended claims are to be construed to cover all equivalent structures falling and methods within the true scope and spirit of the invention.

I claim:

1. A filter system for cleaning and reconditioning used industrial oil, the system comprising:

means for continuously pumping said oil into said system, means for preheating incoming oil to a selected temperature, axial-flow filter means including at least one layer initially comprising a loosely packed blend of flexible fiber material and of rigid excelsior-like fiber material, said fibers being compressed in a dry state upon initiation of flow of said oil, and said flexible fibers being approximately 60% to 50% of the total volume of said layer, whereby said filter means receives and passes all of said oil to mechanically clean same and to break and absorb water emulsions and droplets therefrom, a heating chamber means for receiving said oil and vaporizing volatile contaminants from same, and means for conveying cleaned and reconditioned oil away from said filter system.

2. The filter system of claim 1 wherein said layer of blended fibers comprises cotton and wood fibers substantially uniformly mixed together and wherein wood fibers constitute approximately 40% of the total blend, measured by volume.

3. The filter system of claim 1 wherein said filter means further comprises a generally cup shaped housing closed at the top by a vented lid and having a dirty oil inlet in the bottom and a clean oil outlet near the top, wherein said flexible and rigid fibers form a first layer in the bottom of said housing, wherein said heating chamber is positioned above said layer of fibers, and further comprising means for controlling the heat added to said heating chamber, for establishing very low humidity for said volatile contaminants without establishing a temperature so high as to harm desired additives in said oil.

4. The filter system of claim 1, further comprising a second layer of fibers comprising cotton fibers positioned to receive oil from said one layer.

5. The filter system of claim 1, wherein
said flexible and rigid fibers including fibers of substantially uniform length laid in said filter in a randomly distributed pattern, and
means for transmitting said oil at a pressure sufficiently high to tension said fibers as said oil passes through said filter.

6. The filter system of claim 1, wherein said one layer comprises flexible fibers of cotton-polyester material and rigid excelsior-like fibers of aspen wood.

7. The filter system of claim 6, wherein the polyester content of the cotton-polyester fibers is 30 to 50%.

8. The filter system of claim 1, further comprising a second layer in said filter formed axially downstream of said first layer, and said second layer comprising blended cotton-polyester fibers.

9. The filter system of claim 8, further comprising a third layer in said filter arranged downstream of said second layer, comprising a layer of animal fiber felt.

10. The filter system of claim 1 wherein said one layer of fibers is positioned in the bottom of a cuplike housing which is openable at its top, and further comprising means for selectively introducing compressed air into said housing below said layer of fibers for urging said layer of fibers out of said housing when the layer is contaminated and to be replaced.

11. An axial-flow filter for cleaning and reconditioning industrial oil, the filter comprising a housing, a first media layer including a blend of flexible cotton-like and rigid excelsior-like fibers initially loosely packed in said housing and mixed substantially uniformly together throughout said layer, and a second media layer downstream of said first layer also initially loosely packed in said housing and comprising 100% flexible cotton-like fibers, the first and second media layer being compressed in a dry state upon initiation of flow of said oil into said housing, and the flexible fibers of the first media layer comprising approximately 60% to 50% by volume of said first layer, whereby the first layer including the rigid fibers avoids formation of discrete flow channels through said one layer during operation.

12. The filter of claim 11 wherein said flexible fibers are cotton and said rigid excelsior-like fibers are wood and wherein said wood fibers constitute approximately 40% of the total volume of said blend.

13. The filter of claim 11, wherein said flexible fibers consist of a cotton-polyester material and said rigid excelsior-like fibers consist of aspen wood.

* * * * *